Oct. 20, 1936.  A. PETERSEN  2,057,789
SPUN TUBULAR HOSE AND METHOD OF MAKING THE SAME
Filed Feb. 8, 1933  2 Sheets-Sheet 1
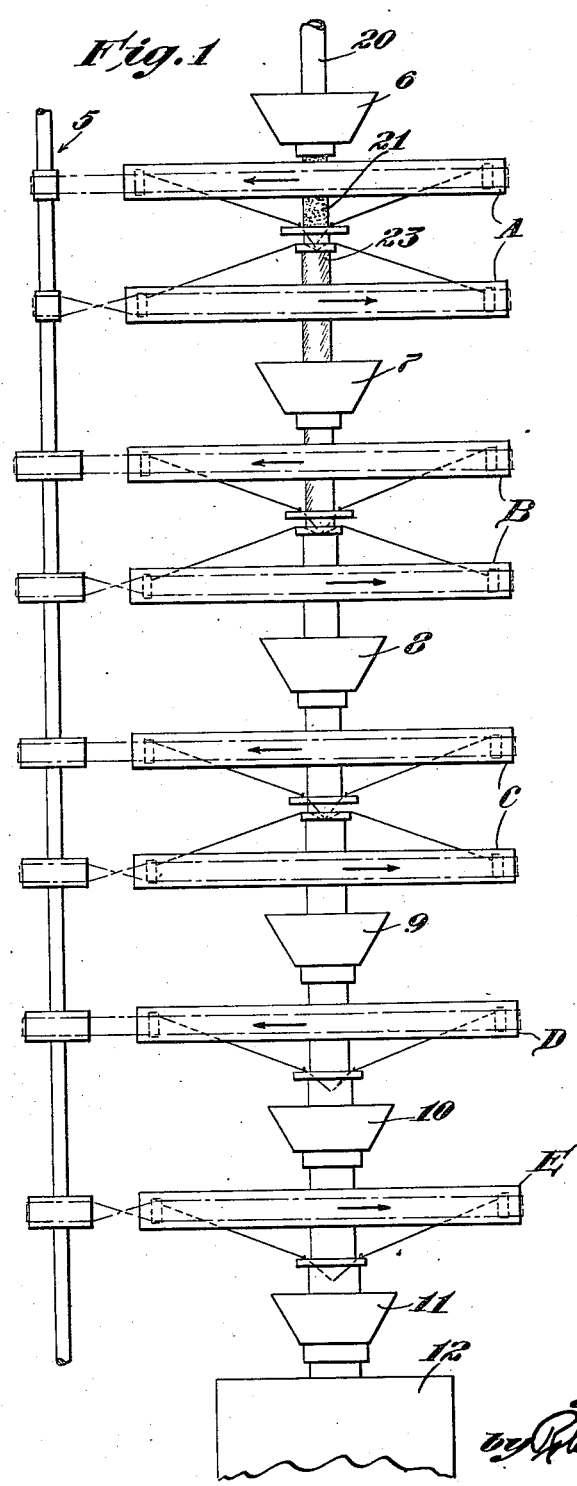
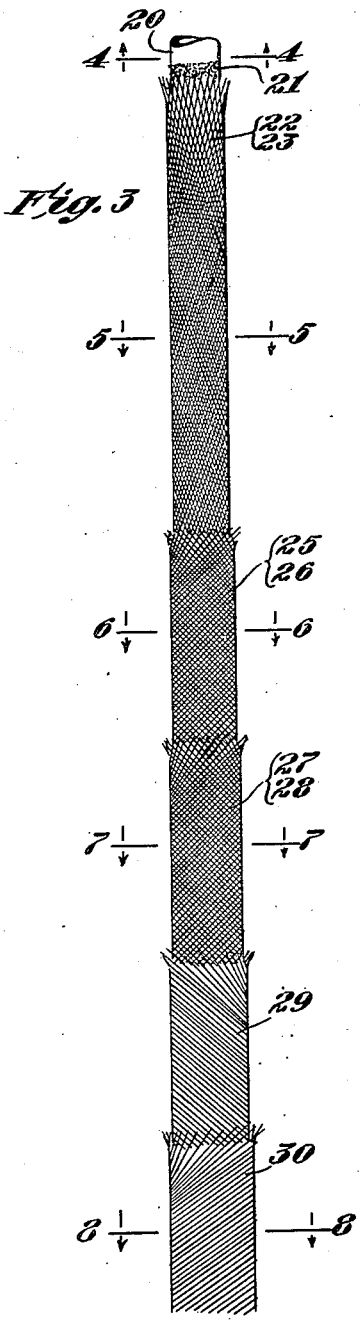
Inventor
Anker Petersen Oct. 20, 1936.  A. PETERSEN  2,057,789

SPUN TUBULAR HOSE AND METHOD OF MAKING THE SAME

Filed Feb. 8, 1933  2 Sheets-Sheet 2

Inventor
Anker Petersen
by Roberts, Cushman and Woodberry
Att'ys.

Patented Oct. 20, 1936

2,057,789

UNITED STATES PATENT OFFICE 2,057,789

SPUN TUBULAR HOSE AND METHOD OF MAKING THE SAME

Anker Petersen, Quincy, Mass., assignor to Armored Tube Company, Malden, Mass., a corporation of Massachusetts Application February 8, 1933, Serial No. 655,727

17 Claims. (Cl. 154—8)

This invention relates to flexible pressure and suction tubing and a method of making the same, the present application being a continuation in part of my copending application Serial No. 417,366, filed December 30, 1929.

The methods heretofore employed in the manufacture of flexible tubing consist in building up a plurality of layers or plies of suitable fabric about a core, such as a rubber tube, carried by a mandrel, the layers being united by a suitable cementitious material such as rubber, and after having built up a wall structure of sufficient thickness and strength to withstand the use to which the finished product is to be subjected, the mandrel is withdrawn and suitable coupling members are attached. With all such methods the maximum length of the finished tube is necessarily limited to the length of the mandrel, and due to the difficulty of withdrawing the mandrel the layers can not be applied under very great tension, nor is it commercially practical to use a mandrel of very great length, particularly when making tubes of very small diameter. Moreover, upon removal of the mandrel, practically all compressive stress on the core is released, and although the tube may offer high resistance to bursting pressures, very little resistance is offered in opposing the crushing or collapsing forces encountered when the hose is used as suction tubing.

In flexible pressure tubing having a woven or braided reinforcing jacket, the strands cross at frequent intervals and are subjected to a succession of relatively sharp bends. Due to such deflections the effective tensile strength of the fabric is far less than the aggregate theoretical strength of the constituent strands, and consequently heavier strands or a greater number of strands are required than would otherwise be necessary to give the maximum theoretical strength. Furthermore, when the tubing is subjected to frequent bending or flexure, as in both air brake hose and pressure lubricating hose, the constant rubbing of the strands at their crossing points tends to produce abrasions and to cause separation of the strands from the binding material, the effects of which greatly impair the strength of the fabric.

In accordance with the present invention the hose or tubing is built directly upon a resilient tubular core which may be of indefinite length by a spinning operation wherein concentric layers of reinforcing material are applied successively to the core, the latter being subjected to gradually increasing, circumferentially distributed compressive stress herein referred to as "hoop compression" or "radial compression", connoting the opposite of the "hoop tension" often referred to in mechanics. During this process, the core, which at the beginning of the operation may be relatively thin-walled, is placed under such hoop compression that its bore or inner diameter contracts appreciably and its walls become proportionally thicker, exerting a uniform radially directed force opposing crushing or collapsing force applied to its outer surface or suction exerted at its interior.

In order to overcome any strains and prevent distortions which might tend to set up a twist in the tubing, due to the helical disposition of the strands, an even number of layers, for example, two, four, six, etc., should be employed, and the companion layers should be preferably applied simultaneously at points very closely adjacent to each other, with the pitch of the coils forming one layer opposite to but of substantially the same angularity as the pitch of the coils of its companion layer. The several strands of the companion layers are laid under as nearly equal and uniform tension as is practical so that each strand shall bear a proportionate share of the imposed load. Preferably the pitch of each of the companion layers or coils should be such as to resist radial and longitudinal stresses to a substantially equal extent, but for special purposes, as, for example, when maximum resistance to bursting is desired and longitudinal expansion or contraction is of minor importance, the pitch of the coils may be varied so as to secure the desired result.

For high pressure lubricating hose, where pressures of the order of twenty-five thousand pounds per square inch are encountered, I prefer to apply some of the coils or layers, for example, the inner layers, at a relatively low pitch ratio (i. e. the ratio in linear measure of the distance between successive turns of the same strand to the diameter of the coil or helix formed thereby), so as to resist bursting, and to give the layers of another pair a much higher pitch ratio to withstand longitudinal pulling strain. Although the pitch ratio of the coils constituting the different pairs of layers may be varied according to the use to which the hose is to be put, I have found that a pitch ratio of the order of 6–7 to 1 for one of the pairs and a pitch ratio of approximately 2 to 1 for the other pair produces a hose possessing flexibility and a maximum resistance to both longitudinal strain and collapsing and bursting pressures.

The strands may be of any suitable material such, for example, as any of the usual textile materials, mineral or metallic fibers, wire, or combinations of these materials, and although the strand may consist of a plurality of elementary strands twisted together or otherwise associated, I prefer to use single or plain strands such as may be produced by the usual spinning, extrusion, or wire drawing processes.

To insure great strength, coupled with light weight and maximum flexibility, I employ at least two pairs of coils consisting of wire strands, which coils are preferably interposed between layers or coils of cushioning strands of a more resilient material such as textile material, asbestos or the like, or, if desired, they may be laid in alternation with the cushioning strands. In either case the cushioning strands not only permit greater flexibility and reduce the weight of the tubing, but also provide a very firm anchorage for the rubber or other binding material.

I have termed the product of the present invention a "spun" hose to distinguish it from tubing made by a weaving, braiding or the like process, since my improved hose may be made by an operation analogous to spinning as distinguished from the much slower and more expensive braiding and weaving operations involving crossing or interwinding strands. This arrangement not only avoids sharp bending of the individual strands so that they are capable of resisting strains substantially to the extent of their theoretical maximum, but furthermore accomplishes a substantial saving in material, due to the fact that the individual strands are not deflected as in woven fabric, which saving sometimes runs as high as 75% in material as compared with braided or woven hose having the same resistance to bursting. Moreover, as the adjacent strands of each of the coils or layers are normally parallel and under substantially equal tension, they mutually reinforce one another and show little or no tendency to move relatively in such a way as to cause separation of the strands from the matrix in which they are embedded.

In the accompanying drawings wherein certain desirable embodiments of the invention are illustrated by way of example:

Fig. 1 is a diagrammatic elevation of an apparatus suitable for carrying out my invention;

Fig. 3 is a plan view showing the multilayer construction of a tubing made in accordance with the present invention;

Figure 4:
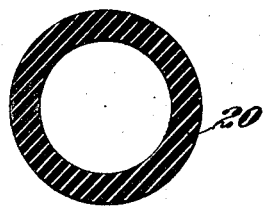
Figure 5:
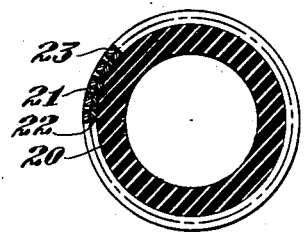
Figure 6:
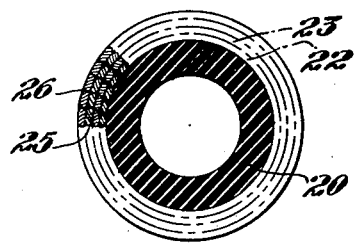
Figure 7:
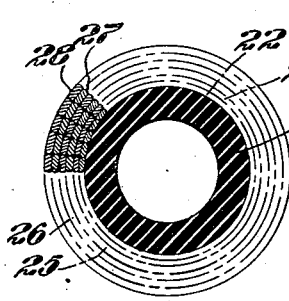
Figure 8:
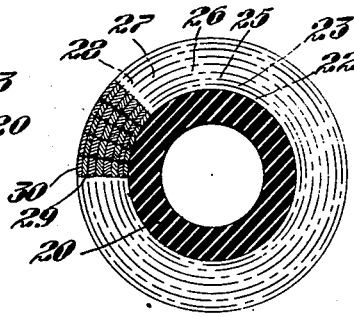
Figure 12:
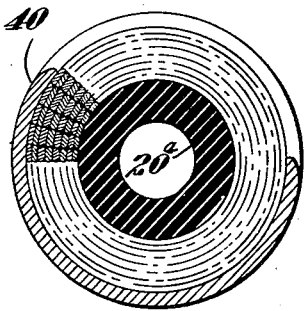
Figure 11:
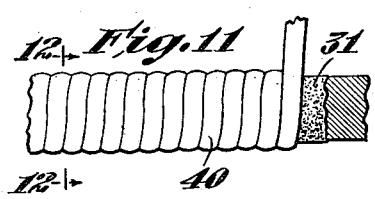
Figure 9:
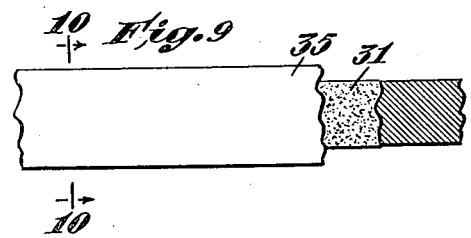
Figure 10:
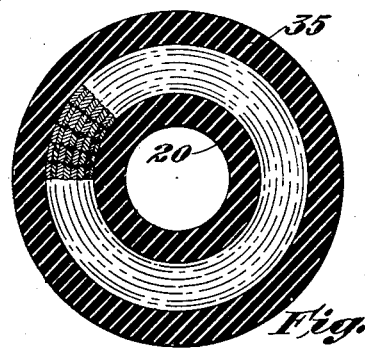

Figs. 4, 5, 6, 7 and 8 are enlarged sections taken on the lines 4—4, 5—5, 6—6, 7—7 and 8—8, respectively, of Fig. 3;

Fig. 9 is a fragmentary plan view of my improved tubing encased in a rubber sheathing or jacket;

Fig. 10 is an enlarged section on the line 10—10 of Fig. 9;

Fig. 11 is a view similar to Fig. 9 showing a tube of slightly modified construction and encased within a metallic jacket; and Fig. 12 is an enlarged section on the line 12—12 of Fig. 11.

Figure 2:
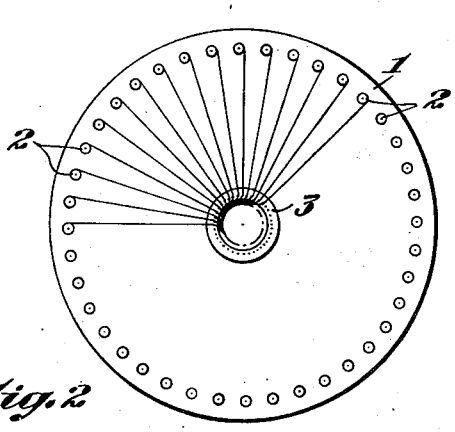
Fig. 2 is a top plane view of the winding or spinning mechanism.

One form of apparatus suitable for carrying out my invention comprises a series of winders, each of which, as shown in Fig. 2, consists of an annular rotatable creel 1 having a plurality of spindles adjacent to its outer periphery for supporting bobbins or spools 2, and strand guiding means 3 concentric with the creel 1 and having circumferentially spaced guide members adjacent to the inner periphery of the creel and rotatable therewith. Suitable tension elements (not shown) may be carried by the creel to vary the tension on each of the individual strands during the winding operation. The winders may be conveniently disposed in spaced aligned pairs A, B, and C with their respective guiding means 3 juxtaposed to each other as shown in Fig. 1. The creels of each pair of winders are rotated at the same speed but in opposite directions by any suitable means such as the series of belts and pulleys, designated generally by the numeral 5. If desired, additional winders D and E may be employed, such winders being mounted and operated in the same manner as winders A, B and C. Suitable means are employed for applying coatings of cementitious material to the core and to each of the several layers, and to this end and as here shown, by way of example, funnel-like hoppers 6, 7, 8, 9, etc., may be disposed above and below or on each side of the winders, as shown in Fig. 1. A reel or other suitable mechanism (not shown) may also be employed for drawing the tube through the winders and hoppers at a uniform predetermined speed.

The tubular core 20 (Figs. 3 and 4) upon which the layers are built may be of a resilient rubber, rubberized fabric, or other suitable material which may be moulded, drawn or otherwise produced, preferably in unlimited lengths. The walls of the core should be relatively contractile and possess sufficient rigidity and/or resiliency to be self-sustaining and capable of maintaining a generally tubular form without the use of a mandrel or other support. For high pressure lubricating hose I have found that ordinary vulcanized rubber tubing having an outer diameter of about 0.375" and an inner diameter of approximately 0.265" meets the above requirements.

The core 20 (Fig. 4) is first coated with a suitable cementitious material capable of forming a resilient matrix 21 in which the tension elements or strands constituting the initial layers 22 and 23 are embedded, and to this end the core may be drawn through the hopper or trough 6 which contains a plastic rubber cement. After having received this first coating the first layers of tension elements or strands are applied about the core by passing the same through the first set of winders A at a uniform rate. During this step the individual strands of each of the companion layers 22 and 23 (Fig. 5) are applied circumferentially about the core in planes closely adjacent to each other and under substantially the same tension. These strands which are preferably of cushion material, for example cotton yarn, are embedded in the matrix 21, and each group is disposed in parallel relation in the form of helical coils coaxial with the core 20. As the creels are rotated at the same speed and at opposite directions, and the two sets of strands applied at substantially the same point longitudinally of the core, all strains which might tend to set up a twist in the hose due to the helical position of the coils are offset or counterbalanced and the hose is subjected to uniform circumferentially distributed contractive forces which oppose any tendency for distortion.

The pitch of the windings or coils, the diameter of the strands to be employed, and the number of such strands may be varied in accordance with the use to which the finished hose is to be put. In making high pressure lubricating hose a pitch ratio (the length of one pitch turn to the diameter of the helix or core to be formed) of approximately 7 to 1 is recommended, and 40 strands more or less of No. 12 cotton yarn per layer is satisfactory when using a core having an outer diameter of approximately 3/8 of an inch. Both the number and character of the strands may, of course, be varied in making hose of larger or smaller diameter.

After the initial layers 22 and 23 have been applied the core is then drawn through the hopper 7, where it receives a second coating of rubber and is then passed through the second set of winders B which preferably carry spools wound with steel strands or wires having a diameter of about .016 inch. During this step a second series of coils constituting the layers 25 and 26 are applied in the same manner as the first series. The creels of the winder B are rotated at an increased speed relative to the speed of the winders A so as to provide coils having a pitch ratio of approximately 2 to 1, and the individual strands are applied under a relatively greater tension than those of the initial layers 22 and 23 so that the core 20 is subjected to increased circumferentially distributed contractive forces, herein referred to as hoop compression. As a result of this operation the inner diameter of the core 20, as shown by a comparison of Figs. 5 and 6, contracts appreciably and the outer diameter to a lesser extent, the walls of the core having become considerably thicker. The entire core is thus held under uniform circumferentially distributed hoop compression which is effective in opposing collapsing force when the hose is subjected to suction or vacuum. The contraction of the core 20 and the amount of hoop compression may be varied by varying the tension on the individual strands during the winding operation and the final dimensions of the core may thus be varied fully fifty per cent. For example, by increasing the tension on the individual strands the inner diameter of the core may be reduced from .265" to less than .150", and the walls of the tube which, at the beginning of the operation, may be relatively thin, may be increased in thickness approximately one hundred per cent.

After having applied layers 25 and 26, another coating of rubber is applied by drawing the hose through the hopper 8, and additional layers 27 and 28 having substantially the same pitch as the layers 25 and 26 may be applied by the winders C in the same manner as previously described. The individual strands of the layers 27 and 28 preferably are of steel wire to provide a strong reinforcement to the layers 25 and 26 although, if desired, other types of strand material may be used either alone or in alternation with metallic strands.

The final layers 29 and 30 are applied by the winders D and E, respectively, coatings of rubber being applied before and after each of these layers by drawing the hose through the hoppers 9, 10 and 11. If desired, the process may be continued so as to build up a hose of any desired thickness. After applying the final layers of strands and rubber coating, the hose is preferably drawn through a receptacle 12 containing a suitable powder, such as talc or zinc stearate, which provides a smooth non-adhesive coating 31 (Figs. 9 and 11), which permits a sheathing or jacket to be drawn easily over the hose.

As shown diagrammatically in Figs. 3 to 8, the hose thus produced comprises a plurality of pairs of concentric layers, each of which consists of a plurality of flexible tension elements embedded in a resilient matrix and disposed side by side in coaxial helical coils having substantially the same pitch ratio as the coils of its companion layer. The pitch of the coils of the initial layers 22 and 23 is considerably greater than that of the superimposed layers so as to provide a maximum resistance to longitudinal strain and bursting pressure. This arrangement, however, may be varied to secure any desired degree of flexibility, weight, resistance to bursting, and longitudinal strength.

In the particular embodiment herein chosen for illustration initial layers 22 and 23 (Figs. 3 and 5) are of No. 12 cotton yarn embedded in the rubber matrix 21 and disposed in coils having a pitch ratio of approximately seven-to-one, the outer diameter of the hose through these layers being approximately 0.40". The layers 25 and 26 (Figs. 3 and 6) are of 0.016" steel wire embedded in a rubber matrix and disposed in coils having a pitch ratio of approximately two and one-half to one. The outer diameter of the hose through these layers is approximately 0.42" due to the contraction of the tubular core 20 from its original dimensions (outer diameter of about 0.375" and inner diameter of about 0.265") to its final form in which its outer diameter is approximately 0.32" and its inner diameter approximately 0.20". The layers 27 and 28 (Figs. 3 and 7) are also of 0.016" steel wire embedded in a rubber matrix and disposed in coils having substantially the same pitch as those of the layers 25 and 26, but having a pitch ratio of about two-to-one, due to the increased diameter of the hose through these layers which is approximately 0.48". The final layers 29 and 30 (Figs. 3 and 8) comprise strands of No. 12 cotton yarn which are likewise embedded in the rubber matrix and disposed in coils having the same pitch as the layers 27 and 28, and the outer diameter of the finished hose through these layers is approximately 0.52". A pressure hose thus constructed will not only withstand pressures greater than 25,000 pounds per square inch, but also the highest vacuums which can be produced by any vacuum pumps available.

In Figs. 9 and 10 I have illustrated a hose made in accordance with the present invention and provided with a jacket or sheathing 35 which not only protects the layers 29 and 30 but also provides an anchorage to which a coupling member may be firmly secured.

The hose shown in Figs. 11 and 12 is a similar construction to that shown in Figs. 9 and 10 and is particularly adapted to withstand high vacuum, and for this reason the core 20ª has been subjected to an increased hoop compression. It will be noted that its walls are considerably thicker and both its inner and outer diameter have been proportionately reduced as compared to the inner and outer diameter of the tube shown in Figs. 4 to 10. In this modification the hose is sheathed in an armored casing 40 which may be either drawn over the core or built up around the same in a manner well known to those skilled in the art.

While I have shown and described different desirable embodiments of the invention, it is to be understood that this disclosure is for the purpose of illustration only and that various modifications and changes in both procedure and the arrangement of parts, as well as the substitution of equivalent elements for those herein shown and described, may be made without departing from the spirit and scope of the invention as set forth in the appended claims.

I claim:

1. The method of making spun tubular hose which comprises winding a plurality of strands helically about a resilient and freely contractible tubular core, the individual strands being applied at circumferential points in substantially the same plane, thereby to form coaxial coils collectively constituting a tubular layer, and simultaneously winding in the opposite direction and at substantially the same pitch a plurality of strands about the first layer, the strands being applied at circumferential points in a plane closely adjacent to the plane of application of the strands of the first layer, thereby forming a second layer in superposed coaxial relation to the first layer, the individual strands of both layers being applied under sufficient tension to contract said core radially and hold the core under hoop compression.

2. The method of making spun tubular hose in substantially unlimited lengths, which comprises as steps providing a resilient contractile tubular core, supporting said core so as to permit it freely to contract in diameter, and while so supporting it, applying two groups of tensioned strands at closely adjacent planes, lengthwise of the core, and causing each group of strands to wrap the core in a helical layer and by the tension of the winding strands compressing the core so as to decrease its diameter and hold the core under hoop compression, the two layers being wound with equal but opposite pitch.

3. The method of making spun tubular hose which comprises applying a coating of cementitious material capable of forming a resilient matrix to the surface of a resilient and freely contractible tubular core, winding a plurality of strands helically about the coated core, the individual strands being applied at circumferential points in substantially the same plane, thereby to form coaxial coils severally embedded in said matrix and collectively constituting a tubular layer, and simultaneously winding in the opposite direction and at substantially the same pitch a plurality of strands about the first layer, the strands being applied at circumferential points in a plane closely adjacent to the points of application of the strands of the first layer, thereby forming a second layer in superposed coaxial relation to the first layer, the individual strands of both layers being applied under sufficient tension to contract said core radially and hold the core under hoop compression.

4. The method of making spun tubular hose which comprises winding two groups of tension elements helically about a resilient and freely contractible tubular core to form a pair of layers comprising coils arranged in superposed coaxial relation with the pitch of the coils of one layer equal but opposite to that of the companion layer, and in a similar manner forming a second pair of layers coaxial with the first pair, the individual strands of each pair of layers being applied at circumferential points in closely adjacent planes and under sufficient tension to contract said core radially and hold it under radial compression, and the coils of one of the pairs having a pitch ratio less than one-half the pitch ratio of the coils of the other pair.

5. The method of making spun tubular hose which comprises so winding two groups of tension elements helically about a resilient and freely contractible tubular core as to form a pair of initial layers comprising coils having a pitch ratio of the order of six to one and arranged in superposed coaxial relation with the pitch of the coils of one layer equal but opposite to that of the companion layer while applying radial compressive force to the core thereby progressively to decrease its external diameter and increase its wall thickness, applying a coating of plastic cementitious material capable of forming a resilient matrix about said layers, and so winding groups of tension elements about the coated layers as further to decrease the diameter of the core while forming a pair of layers comprising coils severally embedded in said matrix and having a pitch ratio less than one-half that of the coils of the initial layer, the pitch of the coils of the latter layers being substantially equal but opposite to each other.

6. The method of making spun tubular hose in substantially unlimited lengths which comprises so winding two groups of tensioned strands helically about a resilient and freely contractible tubular core as to form a pair of layers comprising coils arranged in superposed coaxial relation with the pitch of the coils of one layer equal but opposite to that of the companion layer while progressively applying radial compression to the core thereby to decrease its external diameter while thickening its walls, and similarly forming a second pair of layers coaxial with the first pair, while further compressing the core and decreasing its external diameter, the coils of the first pair being of textile strand material and having a pitch ratio of the order of six to one, the coils of the second pair being of wire and having a pitch ratio of approximately two to one.

7. A spun tubular hose comprising at least two pairs of concentric tubular layers and a tubular core embraced by the innermost of said layers, said core having resilient walls in a state of hoop compression and constantly exerting a powerful radial expansive force against the inner surface of the innermost of said tubular layers such as to resist collapse of the core when subjected to any possible suction effect, each layer comprising a plurality of flexible tension elements disposed side by side in coaxial helical coils, the coils constituting the respective layers of the same pair being of substantially equal and opposite pitch, the coils constituting one of said pairs being of textile strand material and those constituting the other pair being of wire.

8. A spun tubular hose comprising at least two pairs of concentric tubular layers and a tubular core embraced by the innermost of said layers, said core being of highly resilient material and being held by the embracing tubular layers to an abnormally small diameter and constantly exerting a powerful tendency to resume the normal diameter which it would have if unconfined, whereby the core exerts radial outward pressure against the embracing layer such as to prevent its separation therefrom when subjected to the highest possible suction effect, each layer comprising a plurality of flexible tension elements disposed side by side in coaxial helical coils, the coils constituting the respective layers of the same pair being of substantially equal and opposite pitch, the coils constituting the inner pair having a pitch ratio of the order of six to one, and those constituting the outer pair having a pitch ratio of the order of one-half that of the coils constituting the inner pair.

9. A spun tubular hose comprising at least two pairs of concentric tubular layers and a resilient tubular core held in such a state of hoop compression by the embracing tubular layers that its external diameter is substantially less and the thickness of its walls substantially greater than when unconfined, said core constantly exerting a powerful effort to resume its normal dimensions and thereby resisting any action tending to separate it from the inner surface of the innermost tubular layer, each layer comprising a plurality of flexible tension elements disposed side by side in coaxial helical coils, the coils constituting the respective layers of the same pair being of substantially equal and opposite pitch, the coils constituting the inner pair being of textile strand material and having a pitch ratio of the order of six to one, the coils constituting the outer pair being of wire and having a pitch ratio of the order of two to one.

10. A spun tubular hose comprising at least two pairs of concentric tubular layers and a resilient core embraced by the innermost of said layers, said core being of vulcanized rubber held in such a state of hoop compression by the embracing layers that its external diameter is substantially less than though the core were unconfined, said core constantly exerting a powerful radial expansive pressure against the inner surface of the innermost layer such as to prevent separation or relative movement of the core and said layer, each layer comprising a plurality of flexible tension elements embedded in a resilient matrix and disposed side by side, the coils constituting one of the pairs being of textile strand material and having a pitch ratio of the order of six to one, the coils constituting the other of said pairs being of wire and having a pitch ratio of approximately two to one.

11. High pressure tubing comprising a plurality of pairs of concentric tubular layers of strand material and a tubular core embraced by the innermost of said layers, said core being of resilient material in a state of high hoop compression such that it constantly exerts a powerful expansive pressure against the contacting surface of the innermost layer, the strand material forming each layer being embedded in a resilient matrix which completely surrounds each individual strand, the two coils constituting each pair of layers being of opposite and substantially equal pitch, the pitch of the coils constituting the inner pair of layers being less than 45°, and the pitch of the coils of the outer pair being greater than 45°.

12. High pressure tubing comprising a plurality of pairs of concentric tubular layers of metallic strands and a tubular core of vulcanized rubber embraced by the innermost of said layers, said core being held in a state of high hoop compression by the embracing tubular layers, and constantly exerting a powerful expansive force against the contacting surface of the innermost layer, the metallic strands forming each layer being embedded in a rubber matrix which completely surrounds each individual strand, the two coils constituting each pair of layers being of opposite and substantially equal pitch, the pitch of the coils constituting the inner pair of layers being less than 45°, and the pitch of the coils of the outer pair being greater than 45°.

13. The method of making spun tubular hose which comprises so winding two groups of tension elements helically about a resilient and freely contractible tubular core as progressively to decrease the external diameter of the core while increasing its wall thickness and while forming a pair of core embracing layers comprising coils having a pitch ratio of the order of six to one and arranged in superposed coaxial relation with the pitch of the coils of one layer equal but opposite to that of the companion layer, and subsequently forming in similar manner a second pair of layers coaxial with the first pair, the coils of the second pair having a pitch ratio of the order of one-half the pitch ratio of the coils of the first pair, the individual tension elements being applied under such tension as substantially to contract said core radially and thereby place it under powerful hoop compression.

14. The method of making spun tubular hose which comprises so winding two groups of tension elements helically about a resilient and freely contractible tubular core as progressively to decrease the external diameter of the core while increasing the wall thickness thereof and while forming a pair of initial layers comprising coils having a pitch ratio of the order of six to one and arranged in superposed coaxial relation with the pitch of the coils of one layer equal but opposite to that of the companion layer, applying a coating of plastic cementitious material capable of forming a resilient matrix about said layers, winding a plurality of strands helically about the coated layers, the individual strands being applied at circumferential points substantially in the same plane, to form coaxial coils having a pitch ratio less than one-half that of the coils of said initial layers, said coils being severally embedded in the matrix and collectively constituting an intermediate layer, and simultaneously winding in the opposite direction and at substantially the same pitch a plurality of strands about the intermediate layer, the individual strands being applied at circumferential points in a plane closely adjacent to the points of application of said intermediate layer.

15. The method of making spun tubular hose which comprises so winding two groups of textile strand material helically about a resilient and freely contractible tubular core as progressively to decrease the external diameter of the core while increasing its wall thickness and while forming initial layers comprising coils having a pitch ratio of the order of six to one and arranged in superposed coaxial relation with the pitch of the coils of one layer equal but opposite to that of the companion layer, applying a coating of rubber cement about said initial layers, so winding a plurality of metallic wires helically about the coated layers as to form coaxial coils having a pitch ratio less than one-half that of the coils of the initial layers while further decreasing the diameter of the core, the individual wires being applied at circumferential points substantially in the same plane and being embedded in the rubber cement and forming an intermediate layer, and simultaneously winding in the opposite direction and at substantially the same pitch a plurality of metallic wires about the intermediate layer, the individual wires being applied at circumferential points in a plane closely adjacent to the points of application of said intermediate layer.

16. The method of making spun tubular hose which comprises winding two groups of tension elements helically about a resilient and freely contractible tubular core to form a pair of layers comprising coils arranged in superposed coaxial relation with the pitch of the coils of one layer equal but opposite to that of the companion layer, and in similar manner forming a second pair of layers coaxial with the first pair, the coils of the first pair having a pitch ratio at least twice that of the coils of the second pair, the individual elements of each pair of layers being applied at circumferential points in a plane closely adjacent to the points of application of the elements of the companion layer and under sufficient tension to contract said core radially and hold it under hoop compression.

17. A spun tubular hose comprising at least two pairs of concentric tubular layers and a tubular resilient core embraced by the innermost of said layers, said core being of resilient material and being held in such a state of radial compression by the embracing layers that its external diameter is less and its wall thickness greater than when the core is unconfined, whereby it constantly exerts a powerful expansive pressure against the innermost embracing layer, each such layer comprising a plurality of flexible tension elements embedded in a resilient matrix and disposed side by side, the coils constituting one of the pairs having a pitch ratio of the order of six to one, the coils constituting the other pair having a pitch ratio of the order of two to one.

ANKER PETERSEN.